United States Patent [19]
Suda et al.

[11] 4,388,994
[45] Jun. 21, 1983

[54] FLAT-ARTICLE SORTING APPARATUS

[75] Inventors: Kazuyoshi Suda; Akira Fujimura; Kiyoshi Tsuda, all of Tokyo, Japan

[73] Assignee: Nippon Electric Co., Ltd., Tokyo, Japan

[21] Appl. No.: 207,038

[22] Filed: Nov. 14, 1980

[30] Foreign Application Priority Data

Nov. 14, 1979 [JP] Japan .................. 54-147404

[51] Int. Cl.³ .................. B07C 5/38; B65H 39/02
[52] U.S. Cl. .................. 209/564; 209/583; 209/900; 270/58
[58] Field of Search ............. 209/563, 564, 569, 583, 209/584, 900; 270/58; 271/297, 305

[56] References Cited
U.S. PATENT DOCUMENTS

| | | | |
|---|---|---|---|
| 3,261,464 | 7/1966 | Levy | 209/900 X |
| 3,420,368 | 1/1969 | Rosenberg et al. | 209/900 X |
| 3,889,811 | 6/1975 | Yoshimura | 209/900 X |
| 4,247,008 | 1/1981 | Dobbs | 209/584 X |

*Primary Examiner*—Robert B. Reeves
*Assistant Examiner*—Edward M. Wacyra
*Attorney, Agent, or Firm*—Sughrue, Mion, Zinn, Macpeak and Seas

[57] ABSTRACT

A mail sorter has a sort code reader which sequentially reads the sort codes on each piece of mail, a processor for determining the order in which the mail is to be sorted, primary sort storages, and secondary sort storages. After the sort codes are read and processed, the mail is first sorted into the primary sort storages forming groups of mail sorted according to the determined order of sorting, although the mail in each group is unsorted. Thereafter, the mail in each primary sort storage is sorted into the secondary sort storages according to the determined order of sorting and the mail is subsequently extracted from the secondary sort storages and stored.

8 Claims, 12 Drawing Figures

| MICROSWITCH 29 | MICROSWITCH 36 | MICROSWITCH 37 | MOVEMENT OF ENDLESS BELTS 39 AND 40 | MOVEMENT OF MOVABLE PLATE 31 |
|---|---|---|---|---|
| OFF | OFF | OFF | ← | ← |
| ON | OFF | OFF | STOP | ← |
| ON | ON | OFF | STOP | STOP |
| ON | ON | ON | STOP | → |
| OFF | ON | ON | ← | ← |

( ← : TO THE FEEDER 22.)

FLAT-ARTICLE SORTING APPARATUS

BACKGROUND OF THE INVENTION

1. Field of the Invention

This invention relates generally to flat-article sorting apparatus and more particularly to those of the type designed to rearrange a set of flat articles in a predetermined order and suited, for example, for use in rearranging flat mail pieces in the order required for delivery.

2. Description of the Prior Art

For mail delivery, it is necessary to arrange a large number of mail pieces in advance in the order that they are to be delivered. To perform such mail arrangement in an automatic fashion, a mail delivery sorting apparatus has already been proposed, in which sort codes placed in advance on individual mail pieces to represent the destinations thereof are read out and the mail pieces are sorted for delivery by use of the read-out sort codes. In prior art mail delivery sorting apparatus, sort codes placed on the mail pieces to be sorted for delivery are read out and the mail pieces are sorted in a set of pockets in accordance with the sort codes read out, followed by secondarily sorting or rearranging the mail pieces in each of the sort pockets in the order of delivery. In such prior art apparatus, however, different numbers of mail pieces are stored in the individual sort pockets because the numbers of mail pieces addressed to respective destinations usually differ from each other, varying day by day or season by season. On account of this, every sort pocket is required to have all the same full large capacity, involving the disadvantages such as an unduly large size of the sorting apparatus as a whole and an extremely limited rate of utilization of the sort pockets.

SUMMARY OF THE INVENTION

It is therefore an object of the present invention to provide an improved flat-article sorting apparatus of the type described having sort storages of a reduced size in which flat-articles are distributed evenly into the sort storages.

In the flat-article sorting apparatus according to the invention, the flat articles are extracted sequentially one by one, scanned to read out the sort codes such as bar codes placed thereon, and stored in the original order while the data of the read-out sort codes is processed to assign a priorty order to each flat article for rearrangement of the flat articles. The flat articles are then primarily sorted, in accordance with their priority order determined for rearrangement, in a plurality of primary sort storages which are in turn ranked in priority and adapted to store an identical number of the flat articles. The flat articles having the highest priority orders are stored in the highest ranked primary sort storage, and of the remaining articles, those with the highest priority orders are stored in the secondly ranked primary sort storage, and so on. The flat articles stored in the most highly ranked primary sort storage are extracted sequentially one by one and secondarily sorted in accordance with their priority order for rearrangement, being distributed among a plurality of secondary sort storages ranked themselves in priority. The secondary sort storages correspond in number to the number of flat articles stored in each of the primary sort storages, and the flat articles are extracted from the secondary sort storages in the order of the priority of the secondary sort storages, that is, in the order of the priority assigned to the flat articles. The flat articles stored in the next-highest ranked primary sort storages are then sorted in the secondary sort storages in the same manner and extracted therefrom in their priority orders, which is continued till the flat articles stored in the primary sort storage of the lowest priority rank are sorted.

The above and other objects, features and advantages of the present invention will become apparent from the following description when taken in conjunction with the accompanying drawings.

DESCRIPTION OF THE PREFERRED EMBODIMENTS

Figure 1:
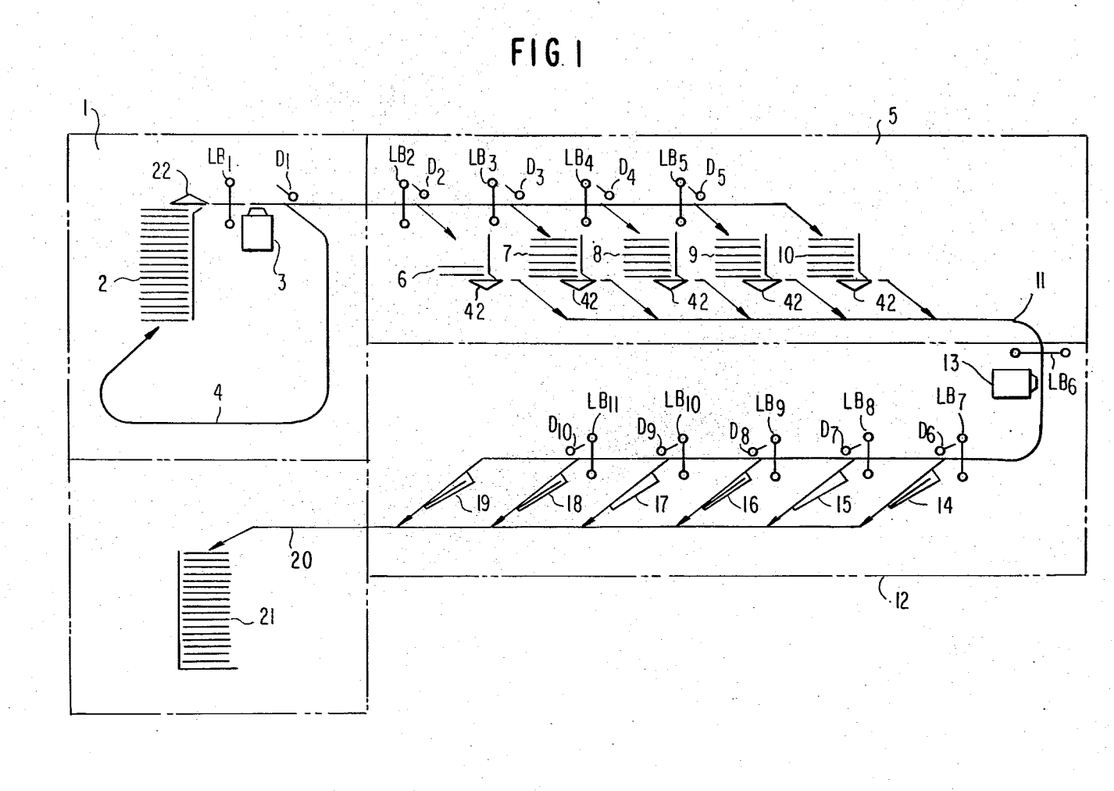
FIG. 1 is a schematic view showing the entire structure of a preferred embodiment of the present invention.

Referring to FIG. 1, a mail delivery sorting apparatus embodying the principles of the present invention comprises a feeder section 1 which includes a hopper 2 supplied with a definite number of mail pieces each carrying a bar code corresponding to the address thereof. The mail pieces are ejected or extracted from the hopper 2 sequentially one by one into a transport path along which a code reader 3 is arranged to read out the bar codes on the individual mail pieces passing in front of the code reader. The mail pieces passing past the code reader 3 are routed through a return path 4 to be stored in the hopper 2 in the same order as initially stacked therein. The data output of the code reader 3 is fed to and processed in a data processor (not shown) to determine the order in which the mail pieces are to be delivered and the processor assigns a priority order to the respective mail pieces which is utilized to determine the sort destinations of the mail pieces in a primary sorting section 5 and a secondary sorting section 12 of the sorting apparatus, as will be described later in detail.

For the sake of convenience, it is assumed that the mail pieces initially stacked in the hopper 2 are 30 in number and are indicated by $P_1, P_2, \ldots, P_{30}$, respectively. The output data of the code reader 3 is fed to the processor where the priority order $N_1$ to $N_{30}$ is assigned to the mail pieces $P_1$ to $P_{30}$ in accordance with the predetermined order for delivery of the mail pieces. Upon completion of the data processing in the processor, the mail pieces returned to the hopper 2 are again extracted therefrom and directed this time to a primary sorting section generally indicated by the reference numeral 5. The primary sorting section 5 includes five storages 6 to 10 among which thirty mail pieces are distributed, six mail pieces in each storage. Specifically, in the storage 6 of the highest priority rank, six mail pieces are stored corresponding to priority orders $N_1$ to $N_6$ and, in storage 7 of the second priority rank, six mail pieces are stored corresponding to priority orders $N_7$ to $N_{12}$. Similarly, mail pieces corresponding to priority orders $N_{13}$ to $N_{18}$, $N_{19}$ to $N_{24}$, and $N_{25}$ to $N_{30}$ are stored in storages 8, 9 and 10 of the third, fourth, and lowest priority rank, respectively. It is to be noted, however, that, in each of the storages 6 to 10, the mail pieces stored are not arranged in the order of priority yet but in random order.

When all of the thirty mail pieces $P_1$ to $P_{30}$ have been distributed in the primary sorting section 5, a secondary sorting operation is started. First, the six mail pieces stored in storage 6 of the highest rank are extracted sequentially one by one and routed through a transport path 11 to a secondary sorting section generally indicated by the reference numeral 12. In this section 12, first the bar code on each of the mail pieces is read out by a code reader 13 arranged along the transport path 11 and the mail piece is stored in one of six secondary sort storages 14 to 19 which has been designated based on the priority order of the mail piece detected according to the reader output. Specifically, the mail pieces corresponding to the priority orders $N_1$ to $N_6$ are directed to the respective storages 19, 18, . . . , 14 of the first, second, . . . , sixth priority ranks which are arranged in accordance with the priority rank from the near place to the remote place with respect to the output point of the secondary sorting section 12. Upon completion of such distribution, the mail pieces stored one in each of the storages 14 to 19 are ejected therefrom all at the same time into a common transport path 20 so as to be automatically stacked in an accumulating section 21 in order of priority orders $N_1$ to $N_6$, i.e., in delivery order of the mail pieces.

After the mail pieces from the highest rank storage 6 of the primary sorting section 5 have been stacked in the accumulating section 21 in priority order, the sets of mail pieces held in storages 7 to 10 of the subsequent priority ranks are successively processed in the same manner as described above and stacked in the accumulating section 21. It will be recognized that in this manner there is obtained in the accumulating section 21 a stack of thirty mail pieces rearranged in delivery order.

In the secondary sorting section 12, the code reader 13 arranged along the transport path 11 is not theoretically needed since the sort informations of the mail pieces stored in the primary sort storages 6 to 10 have already been inputed to the processor, but is favorably set for actual operation because some mail pieces might fall out of the transport path 11.

Description will next be made in more detail of the respective sections of the apparatus shown in FIG. 1.

Figure 2:
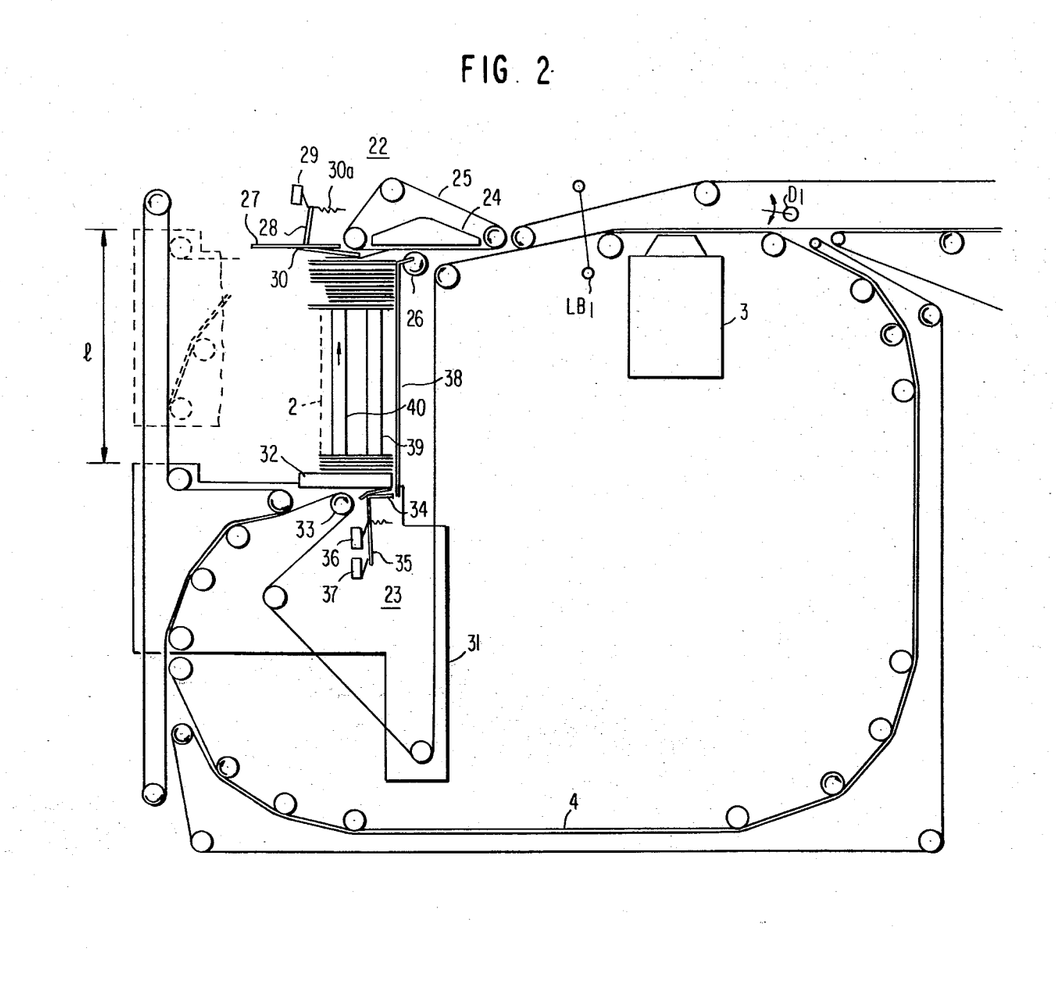
FIG. 2 is a view showing in detail the structure of the feeder section of the apparatus shown in FIG. 1.

Referring to FIG. 2, in which the structure of feeder section 1 is shown with a predetermined number of mail pieces stacked in hopper 2, the feeder section 1 includes an output mechanism 22 operative to discharge the mail pieces out of the hopper 2 sequentially one by one and an accumulating mechanism 23 for reaccumulating the mail pieces so discharged in the hopper 2. The discharge mechanism 22 is comprised of a suction chamber 24, a perforated endless belt 25 arranged to run along the front face of the suction chamber 24, a roller 26 arranged opposite to the belt 25 and rotatable in a direction opposite to that of the belt run to prevent doubling of the rail pieces, a guide plate 27 provided behind the chamber 24, an L-shaped or two-armed lever 28 arranged with one arm thereof extending below the guide plate 27 for pressure engagement with and detection of the mail stacked in the hopper 2, and a microswitch 29 operable in response to a change in the angular position of lever 28. Incidentally, the L-shaped lever 28 is pivotally mounted at point 30 with a tension spring 30a connected at one end to the other arm of the lever 28 to urge the latter in a clockwise direction as viewed in FIG. 2.

The restacking or reaccumulating mechanism 23 serves the purpose of accumulating the mail pieces coming through the return path 4 again in the hopper 2 in the same order as initially stacked therein and is mounted on a movable base plate 31. A partition plate 32 is inserted behind the set of mail pieces initially stacked in the hopper 2 to serve the purpose of separating the set of mail pieces from those returned to the hopper and has such a thickness as not to allow its passage through the output mechanism 22. Mail pieces returning through the return path 4 are accumulated in succession behind the partition plate 32 under the combined effect of a roller 33 over which the endless belt 4 forming the return path 4 is entrained and a guide plate 34 arranged adjacent to the roller 33. The guide plate 34 is provided with an L-shaped lever 35 which is substantially similar to the L-shaped lever 28 and serves the function of detecting pressure of the mail pieces returned to the hopper 2. Provided adjacent to the L-shaped lever 35 are two microswitches 36 and 37 which are arranged to operate in response to the pivotal movement of lever 35 to detect the mail pressure in two steps. As the mail pressure rises, first the microswitch 36 and then the microswitch 37 are turned ON.

Figure 3:
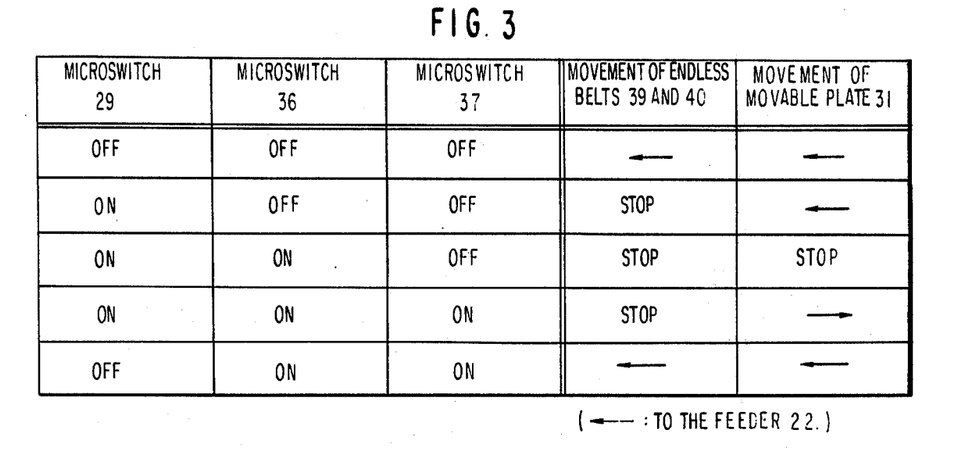
FIG. 3 is a chart explanatory of the controlled movements of the mail-transferring endless belts and the movable base plate in the output region shown in FIG. 2.

The hopper 2 includes a back guide plate 38 ane embossed endless belts 39 and 40 which together form the bottom of the hopper 2 and act to advance the mail pieces held therein along the guide plate 38 in a direction toward the discharge mechanism 22. The movable base plate 31 and endless belts 39 and 40 are controlled to operate in the manner indicated in the table of FIG. 3. In this table, the direction of movement toward the discharge mechanism 22 is indicated by the arrow directed leftward "←". Referring again to FIG. 1, a detector $LB_1$ is arranged ahead of the code reader 3 to detect the sequentially discharged mail pieces and the read timing of code reader 3 is determined in appropriate relation to the time of mail detection of the detector $LB_1$. A diverter $D_1$ is provided at a branch point between the return path 4 and a transport path which extends into the primary sorting section 5. To route the mail pieces from the hopper 2 into the return path 4, the diverter $D_1$ is actuated. Means for driving the endless belts 39 and 40 and movable base plate 31 may take any conventional form and are not shown here for the sake of simplicity. The base plate 31 is movable in a range indicated at l in FIG. 2 in accordance with the change in volume of the mail remaining in hopper 2.

Figure 2A:
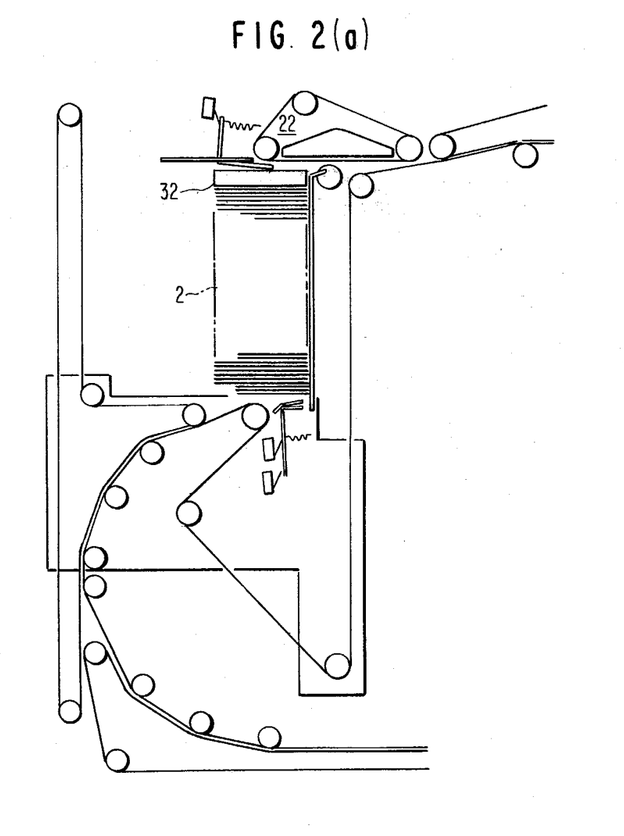
FIGS. 2a and 2b illustrate the output region of the feeder section shown in FIG. 2 in different states in one cycle of operation.
Figure 2B:
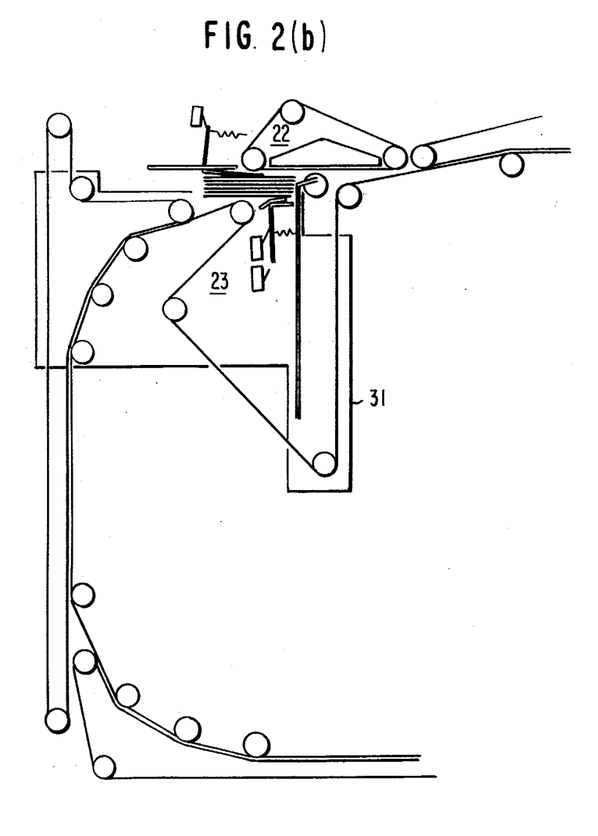

FIG. 2a illustrates the state of feeder section 1 when all the mail pieces initially stacked in hopper 2 have been routed through the return path 4 and have been reaccumulated in the hopper 2. As shown, the partition plate 32 is in its top position adjacent to the mail-discharging mechanism 22. During this process of mail reaccumulation, the sort codes placed on the individual mail pieces are all read only by the code reader 3. FIG. 2b illustrates the state of feeder section 1 as assumed when the set of mail pieces that have been read and reaccumulated in the hopper 2 is being fed to the primary sorting section 5. It is to be understood that such mail feeding to the primary sorting section 5 is started only after the partition plate 32 has been removed from the hopper 2 in the state shown in FIG. 2a.

Figure 4:
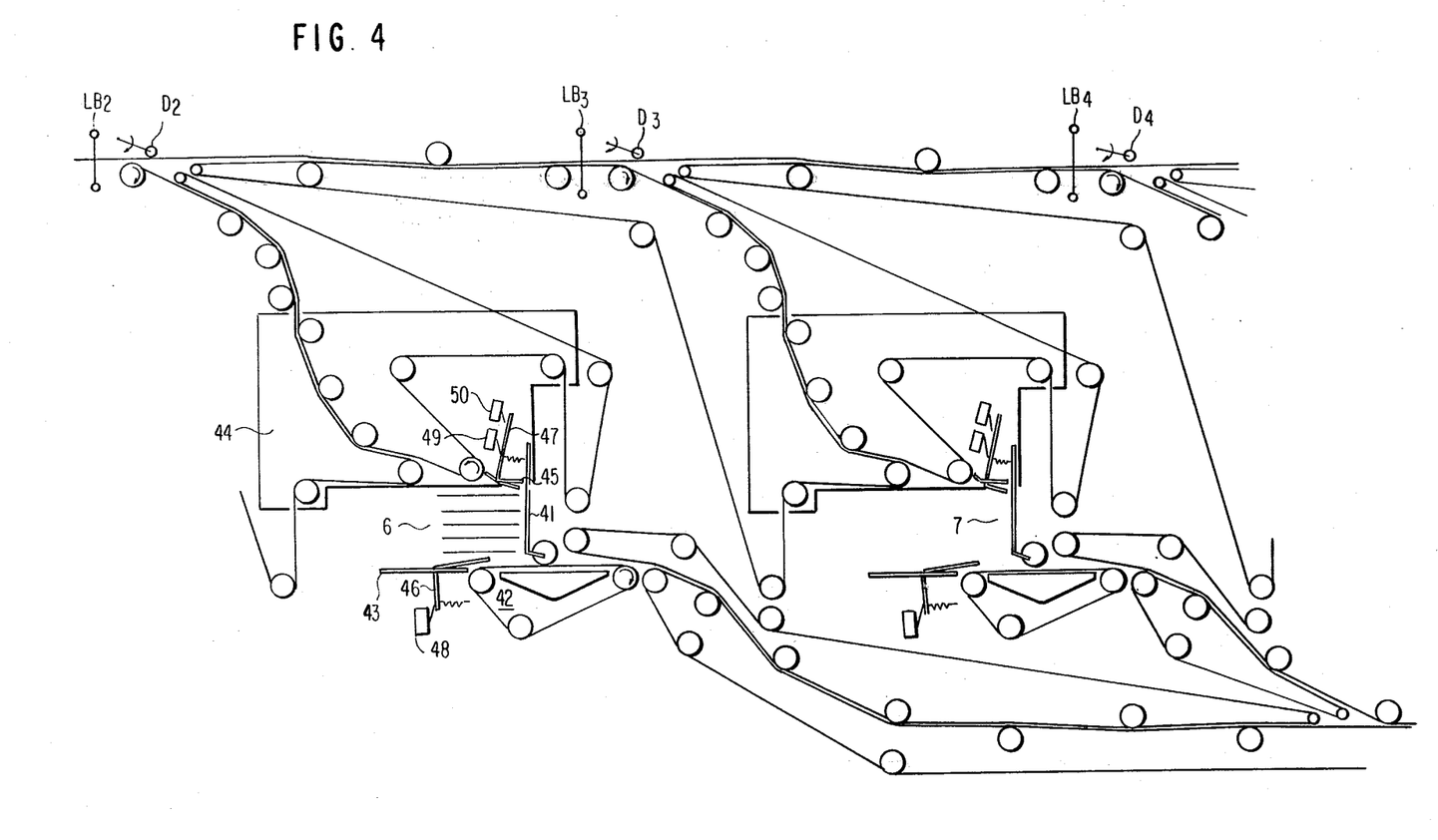
FIG. 4 is a view showing in detail the primary sorting section of the apparatus shown in FIG. 1.

Description will next be made in detail of the primary sorting section 5 with reference to FIGS. 1 and 4.

As illustrated in FIG. 1, the primary sorting section 5 includes five storages 6 to 10 and diverters $D_2$ to $D_5$ provided at the entrance of respective storages 6 to 9. Detectors $LB_2$ to $LB_5$ are arranged ahead of the respective diverters $D_2$ to $D_5$ for timing the diverter operation. FIG. 4 illustrates a part of the primary sorting section 5 including storages 6 and 7. All of the mail pieces diverted by diverter $D_2$ are directed through a transport path formed by a pair of opposed endless belts to the storage 6. The storage 6 is comprised of a guide plate 41 against which the incoming mail piece abuts, a discharge mechanism 42 consisting of a suction chamber and a perforated endless belt operative to sequentially discharge the mail pieces stored in the storage 6, a guide plate 43 arranged behind the discharge mechanism 42 to support the mail pieces stored in the storage 6, a movable base plate 44, another guide plate 45 mounted on the movable base plate 44 movable therewith in response to changes in mail volume in the storage 6, levers 46 and 47 pivotally secured to respective guide plates 43 and 45 to operate in accordance with the mail volume in the storage 6, microswitches 48, 49 and 50 arranged opposite the levers 46 and 47 to detect the mail volume through the intermediary thereof, and endless belt means (not shown) for supporting and moving the mail pieces toward the discharge mechanism 42. Operation of the storage 6 is similar to that of the hopper 2 except that the total volume of mail pieces stored in the former differs from that in the latter. It is to be noted that the base plate and associated endless belting are shifted in response to the output of microswitches 48 to 50. Other storages 7 to 10 are each the same as the storage 6 in construction and operation and will not be described further in any detail.

Figure 5:
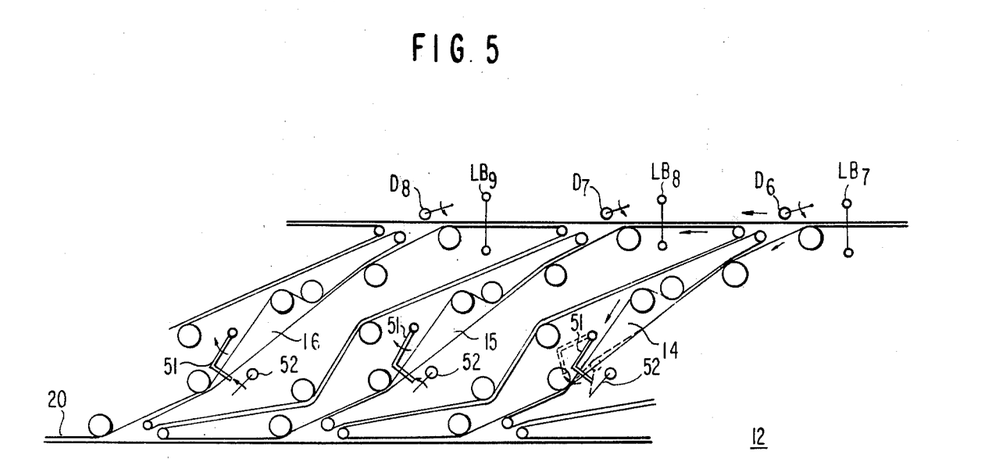
FIG. 5 is a view showing in detail the secondary sorting section of the apparatus shown in FIG. 1.

Description will next be made of the secondary sorting section 12 with reference to FIGS. 1 and 5. Referring to FIG. 1, the secondary sorting section 12 includes a code reader 13 and six storages 14 to 19. Arranged ahead of the code reader 13 is a detector $LB_6$ for timing the read operation thereof. Provided at the entrance of respective storages 14 to 18 are diverters $D_6$ to $D_{10}$ and associated detectors $LB_7$ to $LB_{11}$ provided for timing the diverter operation. FIG. 5 illustrates in detail a part of the secondary sorting section including storages 14, 15 and 16. It is to be noted that the storages in the secondary sorting section 12 are each required only to accommodate a single mail piece therein and formed, in the embodiment illustrated, of two opposed endless belts. In the secondary sorting operation, the set of mail pieces held in each of the primary sort storages 6 to 10 is distributed among the secondary sort storages 14 to 19. Specifically, first the mail pieces are sequentially extracted from the primary sort storage 6, highest in rank of priority and, upon selective actuation of the diverters $D_6$ to $D_{10}$, are transferred into the respective secondary sort storages 14 to 19 and held against stop levers 51 provided for each secondary sort storage at the output end thereof. When all the storages 14 to 19 have each been fed with a single mail piece, stop levers 52 and diverters 52 associated therewith are actuated simultaneously into a position as indicated by the broken lines for the storage 14 so that the mail pieces held in the respective secondary sort storages 14 to 19 are released into a common transport path 20 at the same time.

Figure 6:
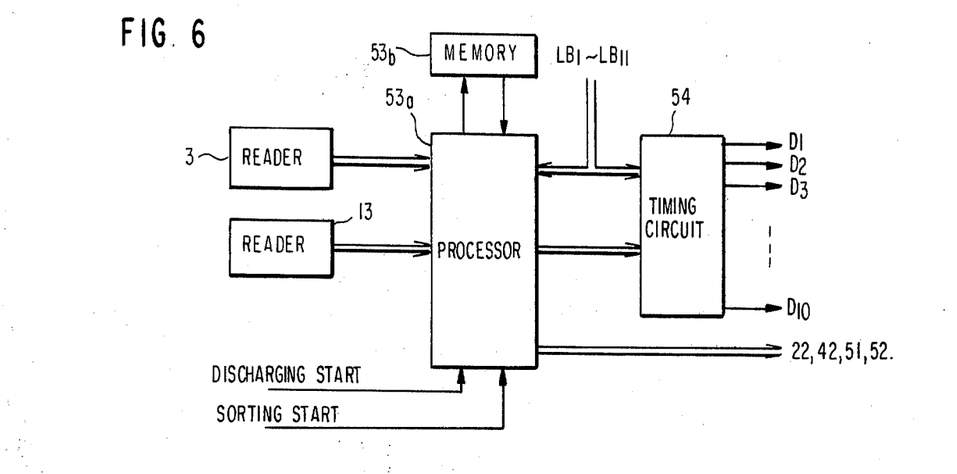
FIG. 6 is a block diagram of the control section of the sorting apparatus of the invention, including a data processor.

Referring now to FIG. 6, which schematically illustrates the general structure of the control section of the sorting apparatus, the control section includes a data processor 53a for controlling the sequential operation of the apparatus. The processor 53a is fed from outside with a feed start command and, subsequently, when the sort codes on the mail pieces have all been read out, with a sort start command. Also fed to the processor 53a are the outputs of code readers 3 and 13. A timing circuit 54 provided for timing the operation of diverters $D_1$ to $D_{11}$ is fed with drive command signals from the processor 53a and with the outputs of detectors $LB_1$ to $LB_{11}$. The processor 53a generates control signals for controlling the discharge mechanism 22 in feeder section 1 (FIG. 1), the five discharge mechanisms 42 in primary sorting section 5, and the six sets of stop levers 51 and diverters 52 in secondary sorting section 12. Information necessary to determine the order for delivery of the mail pieces in accordance with the read-out codes of the mail pieces and other information such as priority orders assigned to the respective mail pieces is stored in the memory 53b.

Reference will next be made to the flow chart of FIG. 7, which illustrates the successive mail processing stages of the sorting apparatus of the present invention. In the step 55, the mail pieces initially stacked in hopper 2 (FIG. 1) are extracted therefrom piece by piece and, being routed through the return path, again stacked in the hopper in the same state as initially stacked therein. Simultaneously, in this step 55 the sort codes on the mail pieces are read out by the code reader 3 and sort destinations of the respective mail pieces are determined in the data processor. In the next step 56, the mail pieces are again extracted from the hopper 2 piece by piece for primary sorting. Finally, in step 57, the primarily sorted mail pieces are secondarily sorted.

Figure 7:
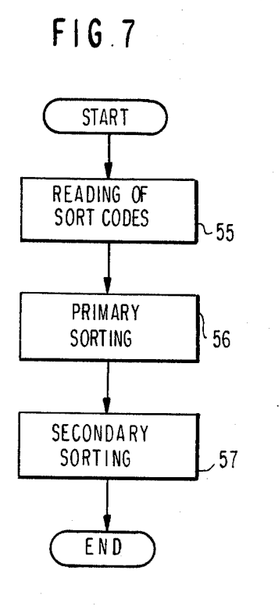
FIG. 7 is a flow chart showing the general sequence of control of the sorting apparatus of the invention.
Figure 8:
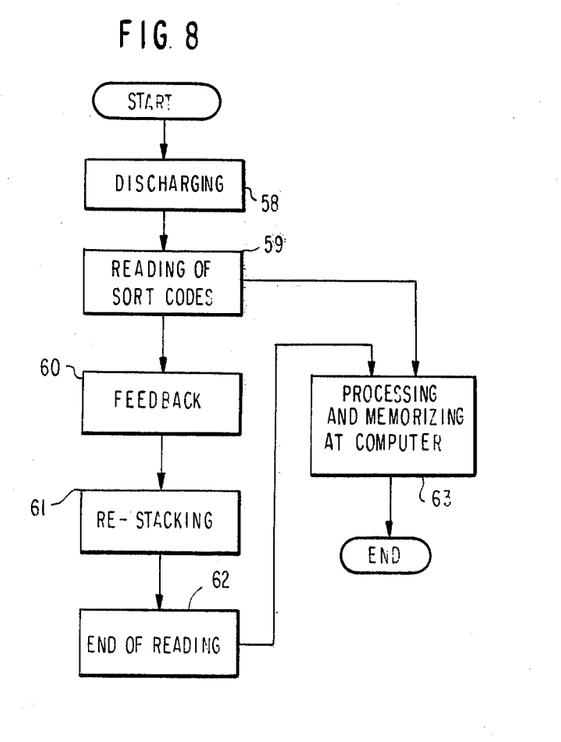
FIG. 8 is a flow chart showing in detail the code-reading stage shown in the chart of FIG. 7, including the restacking function.

FIG. 8 shows the flow in the step 55 of FIG. 7. As observed, the mail flow is controlled in a number of steps including mail discharging from hopper 2 (step 58), sort-code reading (step 59), mail feedback (step 60), mail reaccumulation in hopper 2 (step 61), ending of sort-code reading (step 62), and determining sort destinations by the processor (step 63).

Figure 9:
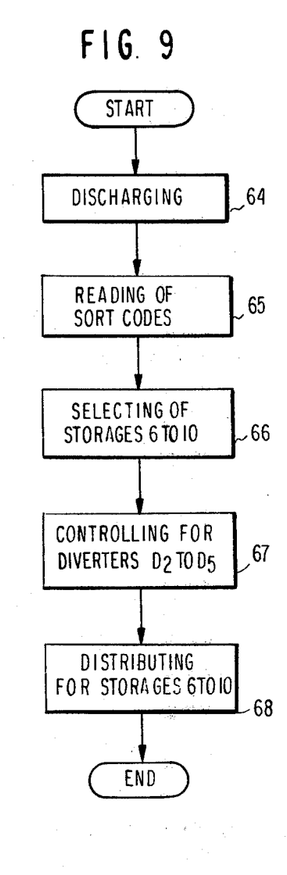
FIG. 9 is a flow chart showing in detail the primary sorting stage shown in FIG. 7.
Figure 10:
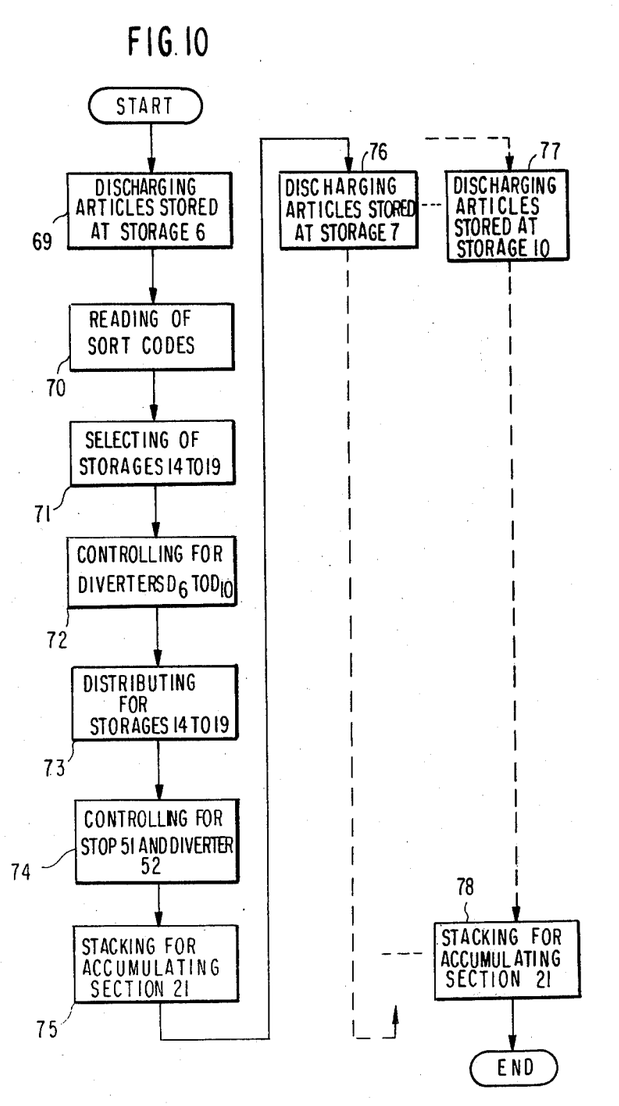
FIG. 10 is a flow chart showing in detail the secondary sorting stage shown in FIG. 7.

FIG. 9 is a flow chart showing the flow in the primary sorting step 56, which is controlled in a number of steps including mail discharging from hopper 2 (step 64), sort-code reading (step 65), selection of storages 6 to 10 (step 66), controlling of diverters $D_2$ to $D_5$ (step 67), and mail accumulation in storages 6 to 10 (step 68). FIG. 10 is a flow chart showing the flow in the secondary sorting step 57 of FIG. 7, which is controlled in a number of steps including mail discharging from storage 6 (69), sort code reading by reader 13 (step 70), selection of storages 14 to 19 on the basis of the reader output (step 71), controlling of diverters $D_6$ to $D_{10}$ (step 72), mail transfer to storages 14 to 19 (step 73), simultaneous actuation of all the stops 51 and diverters 52 (step 74), and mail accumulation in the section 21 (step 75). It will be readily noted that such steps are repeated for all the other primary sort storages 7 to 10, starting with the mail discharging from storage 7 (Step 76). Reference numeral 77 indicates the first step repeated for storage 10 of mail discharging therefrom, and 78 indicates the last step which is accumulation in the accumulating section 21 of the mail from storage 10. In this manner, it will be recognized that all the mail pieces initially stacked in hopper 2 have been restacked in the section 21 in the order in which they are to be delivered.

In the embodiment described, the mail pieces supplied to the hopper are principally sorted evenly into a plurality of primary sort storages and, in cases where the mail supply includes any odd sum, the mail pieces should be sorted so that the storage of the lowest rank of priority contains less mail pieces than are contained sorted in each of the storages of higher priority ranks. The processor counts the total number of mail pieces supplied as the sort codes on the mail pieces are read out and thereupon the numbers of mail pieces to be sorted in the respective primary sort storages are determined in advance for the primary sorting operation.

Further, though the embodiment illustrated has been described, by way of example, as designed for delivery sorting of thirty mail pieces at a time, it may also be employed in practice for delivery sorting, for example, of a thousand mail pieces at a time. In this case, the sorting apparatus should include, for example, twenty primary sort storages and fifty secondary sort storages. In any case, the secondary sort storages used are of an extremely simple structure formed of endless belts as illustrated, requiring only a very limited space therefor and hence enabling realization of a delivery sorting apparatus particularly compact in size for its mail handling capacity.

Further, in the embodiment described herein, the hopper in the feeder section becomes empty when all the mail pieces have been extracted therefrom and can be immediately fed with a fresh set of mail pieces as required. Further, as long as the processor and memory are made sufficiently large in processing and memory capacities, the code reading and processing of the freshly supplied mail pieces can be effected by the use of the hopper 2, code reader 3 and return path 4 during the secondary sorting of the preceding set of mail pieces and hence the rate of utilization of the entire apparatus is materially increased. If a plurality of feeder sections including the hopper 2 are provided and operate by turns to feed the same primary sorting section 5, the sorting operation can be performed continually without any interruption as may otherwise occur each time when a fresh set of mail pieces is supplied. Any interruption of the sorting operation as may be needed for mail removal from the accumulating section 21 can be avoided by providing a plurality of such accumulating sections at the end of the sorting line. Further, it will be readily understood that the delivery sorting apparatus of the present invention can be used with increased efficiency by designing the mail hopper 2 and accumulating section 21 as cassette type units which are particularly easy to handle.

What is claimed is:

1. A flat-article sorting apparatus for rearranging an order of flat articles, each of the flat articles being provided with a sort code thereon, the sort codes corresponding to the order in which the flat articles are to be rearranged, comprising:
   means for advancing the flat articles sequentially one by one;
   means for scanning the flat articles to read the sort codes thereon as the flat articles are sequentially advanced;
   means responsive to the scanned sort codes for determining the order in which the flat articles are to be rearranged;
   a plurality of primary sort storages ranked in a first priority to which said flat articles are advanced;
   means responsive to said determining means for assigning said flat articles so that a substantially equal number of said flat articles are assigned to each primary sort storage;
   means responsive to said assigning means for sorting the flat articles into the respective primary sort storages in such a manner that numbers of the flat articles stored in the respective primary sort storages are substantially equal;
   a plurality of secondary sort storages ranked in a second priority;
   means for advancing said flat articles from said primary sort storages to said plurality of secondary sort storages;
   second means for sorting the flat articles from the primary sort storages into the secondary sort storages according to the order determined by the determining means; and
   means for extracting the flat articles from the secondary sort storages and accumulating the flat articles in the order determined by the determining means.

2. An apparatus as claimed in claim 1, wherein the second sorting means sorts all the flat articles from the highest-ranked primary sort storage containing flat articles into the secondary sort storages, each secondary sort storage containing one flat article, and the extracting means extracts and accumulates the flat articles from the secondary sort storages before the second sorting means sorts the flat articles from the next highest-ranked primary sort storage containing flat articles.

3. An apparatus as claimed in claim 1, wherein the second sorting means sorts all the flat articles from a plurality of the highest-ranked primary sort storages containing flat articles into the secondary sort storages, each secondary sort storage containing one flat article, and the extracting means extracts and accumulates the flat articles from the secondary sort storages before the second sorting means sorts the flat articles from the plurality of next-highest ranked primary sort storages containing flat articles.

4. The apparatus as claimed in claim 1 wherein said scanning means scans said flat articles after said flat articles are advanced from the primary sort storages to the secondary sort storages by the advancing means, and the detecting means determines the order in which the flat articles in each primary sort storage are to be rearranged.

5. A flat-article sorting apparatus for rearranging an order of flat articles, each of the flat articles being provided with a sort code thereon, the sort codes corresponding to the order in which the flat articles are to be rearranged, comprising:
   a stacking unit in which the flat articles are stacked;

discharging means for discharging the flat articles stacked in the stacking unit sequentially one by one;

a code reader arranged to scan the flat articles discharged sequentially by the discharging means to read the sort codes on the flat articles;

means for returning the flat articles successively scanned to the stacking unit so that the flat articles are stacked therein in the same order as initially stacked therein;

means responsive to the scanned sort codes for determining the order in which the flat articles are to be rearranged;

memory means for memorizing the determined order;

a plurality of primary sort storages ranked in a first priority;

means for assigning the flat articles to the primary sort storages so that a substantially equal number of said flat articles are assigned to each primary sort storage in accordance with the order memorized in said memory means;

means responsive to said assigning means for sorting the flat articles sequentially discharged from the stacking unit into the primary sort storages in such a manner that numbers of the flat articles stored in the respective primary sort storages are substantially equal;

a plurality of secondary sort storages ranked in a second priority;

means for extracting the flat articles from each of the primary sort storages sequentially one by one;

means for distributing the flat articles extracted by the extracting means to the secondary sort storages according to the memorized determined order, one flat article being distributed into each secondary sort storage; and means for extracting the flat articles from the secondary sort storages so the flat articles are arranged according to the memorized determined order.

6. A flat-article sorting apparatus for rearranging flat articles comprising:

means for extracting sequentially the flat articles from a stack;

means for reading out codes marked on the extracted flat articles;

means for re-stacking the flat articles whose codes have been read out;

means responsive to the read out codes for determining the order in which the flat articles are to be arranged;

means for transferring the re-stacked flat articles;

a plurality of first-stage sort storages, the first-stage sort storages being ranked in priority to receive a plurality of the flat articles;

means responsive to the determining means for assigning the flat articles to the respective first-stage sort storages so that a substantially equal number of said flat articles are assigned to each first-stage sort storage in accordance with the order determined by the determining means;

means coupled to the transferring means for distributing the transferred flat articles to the first-stage sort storage in response to said assigning means in such a manner that numbers of the transferred flat articles to be stored in the respective first-stage sort storages are substantially equal;

second extracting means coupled to the first-stage sort storages for selectively extracting the flat articles stored in the first-stage sort storages; and means coupled to the second extracting means for sorting the flat articles extracted from the selected first-stage sort storage according to the order determined by the determining means.

7. The apparatus as claimed in claim 6, wherein the sorting means includes a plurality of final-stage sort storages each adapted to receive one flat article, and further comprising means for extracting the flat articles from the plurality of final-stage sort storages in the order determined by the determining means.

8. The apparatus as claimed in claim 6, wherein the sorting means coupled to the second extracting means includes a plurality of final-stage sort storages having outlets, each final-stage sort storage storing a flat article determined according to the order determined by the determining means, the outlets of the final-stage sort storages being arrayed in a line, and further comprising means for simultaneously discharging the flat articles stored in the final-stage sort storages through the outlets of the storages.

* * * * *

UNITED STATES PATENT AND TRADEMARK OFFICE
CERTIFICATE OF CORRECTION

PATENT NO. : 4,388,994

DATED : June 21, 1983

INVENTOR(S) : Kazuyoshi SUDA et al.

It is certified that error appears in the above—identified patent and that said Letters Patent is hereby corrected as shown below:

Col. 4, line 8, change "rail" to --mail--;

line 45, change "ane" to --and--.

Col. 5, line 8, change "only" to --out--.

Col. 6, line 9, (first occurrence) change "52" to --51--.

Signed and Sealed this

Twenty-ninth Day of November 1983

[SEAL]

Attest:

GERALD J. MOSSINGHOFF

Attesting Officer

Commissioner of Patents and Trademarks